(No Model.) 3 Sheets—Sheet 2.
H. C. WARREN.
MACHINE FOR MOLDING ARTICLES FROM PLASTIC COMPOUNDS.
No. 483,663. Patented Oct. 4, 1892.
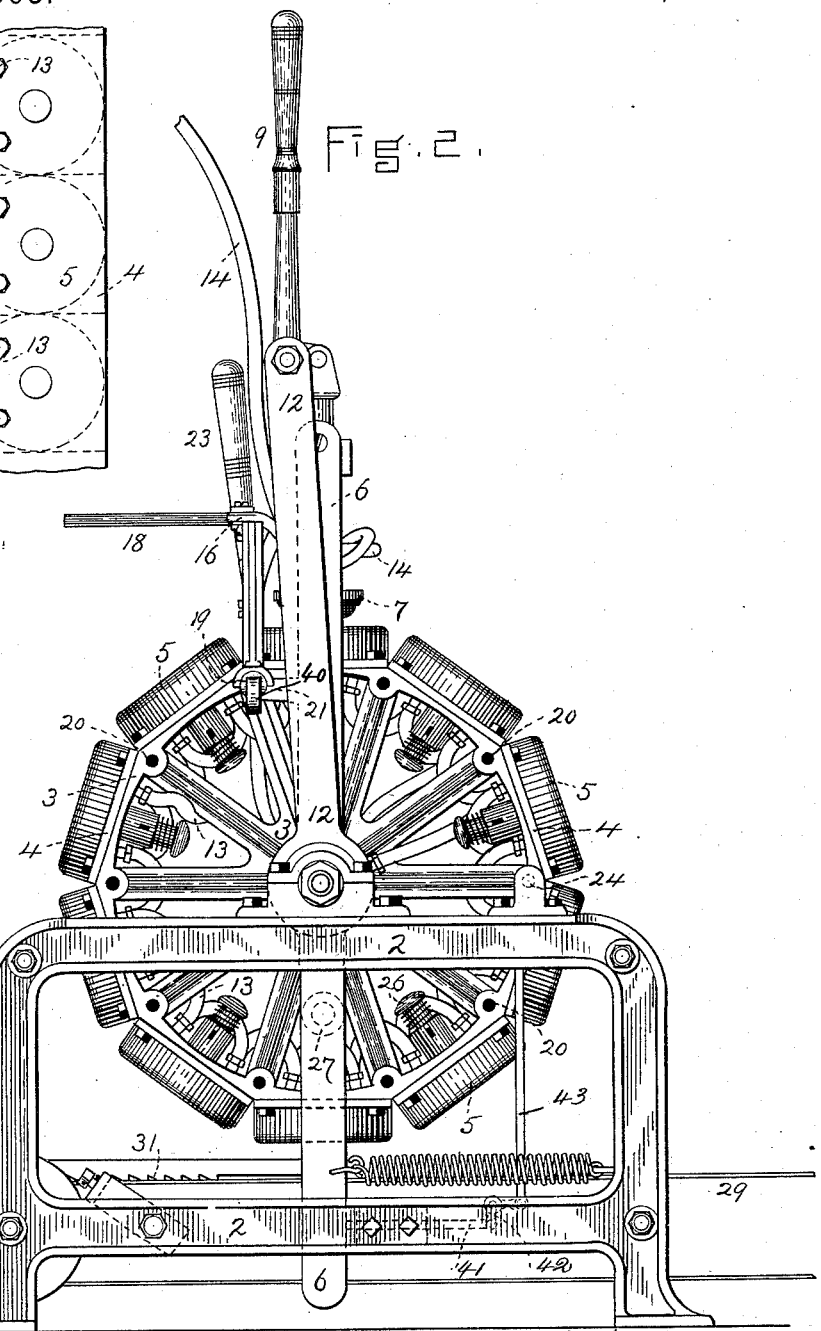
WITNESSES.
Thos. J. Bailey
Francis E. Stanwood
INVENTOR.
Henry C. Warren.
by H. S. Lodge Atty.

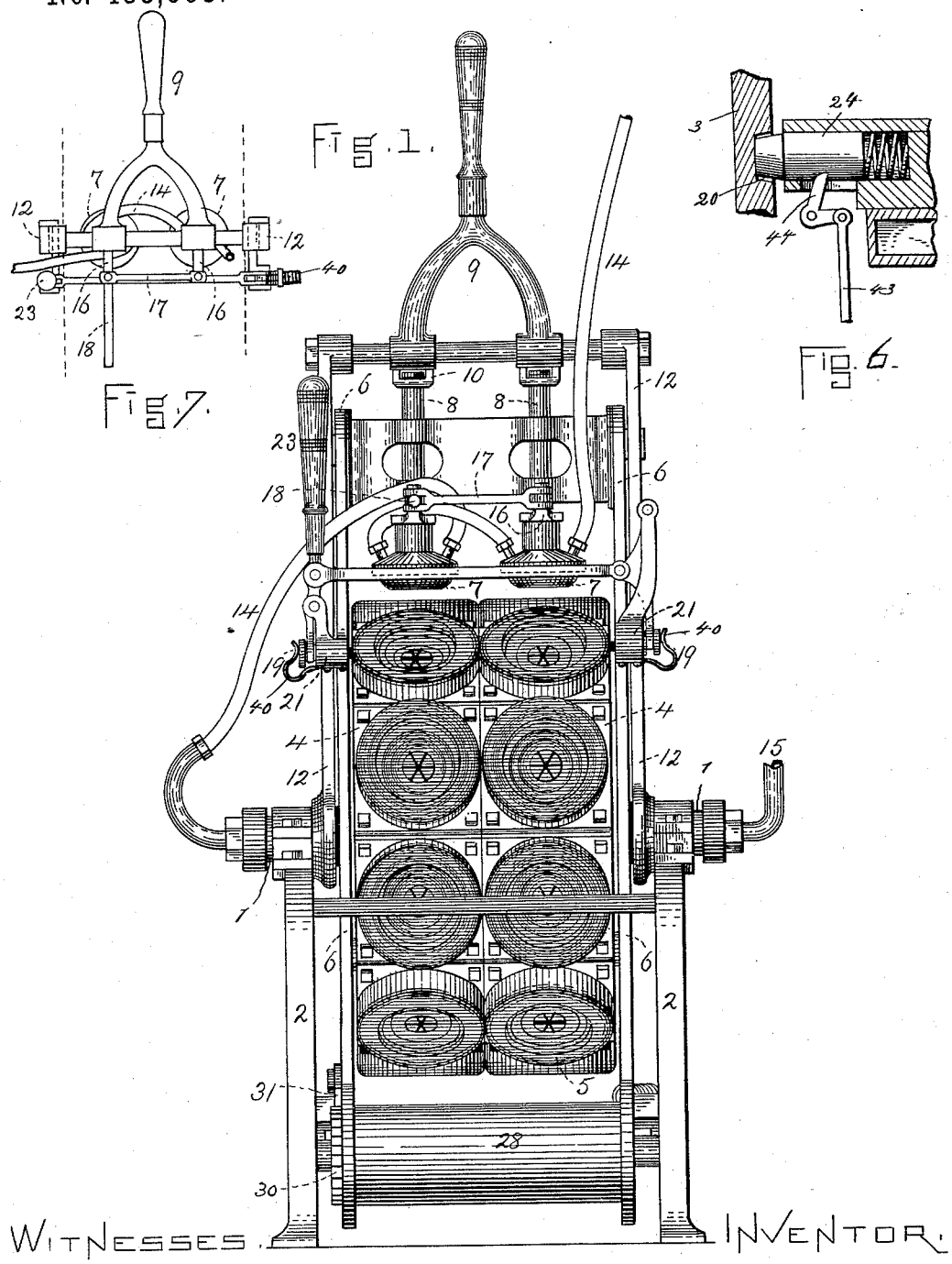

(No Model.) 3 Sheets—Sheet 3.

H. C. WARREN.
MACHINE FOR MOLDING ARTICLES FROM PLASTIC COMPOUNDS.

No. 483,663. Patented Oct. 4, 1892.

WITNESSES.
Thos. J. Bailey
Francis C. Stanwood

INVENTOR.
Henry C. Warren.
by H. E. Lodge Atty.

UNITED STATES PATENT OFFICE.

HENRY C. WARREN, OF BOSTON, MASSACHUSETTS.

MACHINE FOR MOLDING ARTICLES FROM PLASTIC COMPOUNDS.

SPECIFICATION forming part of Letters Patent No. 483,663, dated October 4, 1892.

Application filed May 16, 1892. Serial No. 433,209. (No model.)

*To all whom it may concern:*

Be it known that I, HENRY C. WARREN, a citizen of the United States, residing at Boston, in the county of Suffolk and State of Massachusetts, have invented certain new and useful Improvements in Machines for Molding Articles from Plastic Compounds; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to machines for molding articles from any material or compound when in a plastic condition.

My improvements consist, primarily, in a revolving carrier, which contains a series of molds having the shape of the article to be produced, and of co-operating plungers mounted upon an oscillating frame which has the axis of the carrier for a center; furthermore, in causing a flow of water or other cooling liquid to circulate through the molds and the plungers, since this machine is particularly adapted to the formation of inanimate pigeons or targets for trap-shooting and because said targets are preferably made from tar compounds, which to become plastic must be subjected to heat.

One object in my invention is to cool and harden the molded articles indirectly instead of by the direct application of water, as now practiced.

Another prominent feature in my invention consists in axially rotating the plungers, in order to free them from the molded article and allow the latter to contract freely and prevent breaking should the plungers be allowed to rest upon them when hardening, while at the same time said plungers may be raised without extracting the molded article, which is to be removed subsequently and at a designated time; furthermore, in means for interlocking the carrier and the plunger-frame at certain times, as likewise for locking the carrier to the standard and permitting oscillation of the plunger-frame independently; lastly, in mechanism by which the molded articles are ejected from the molds and delivered upon an endless band, whence they are carried to some suitable storage place.

Figure 4:
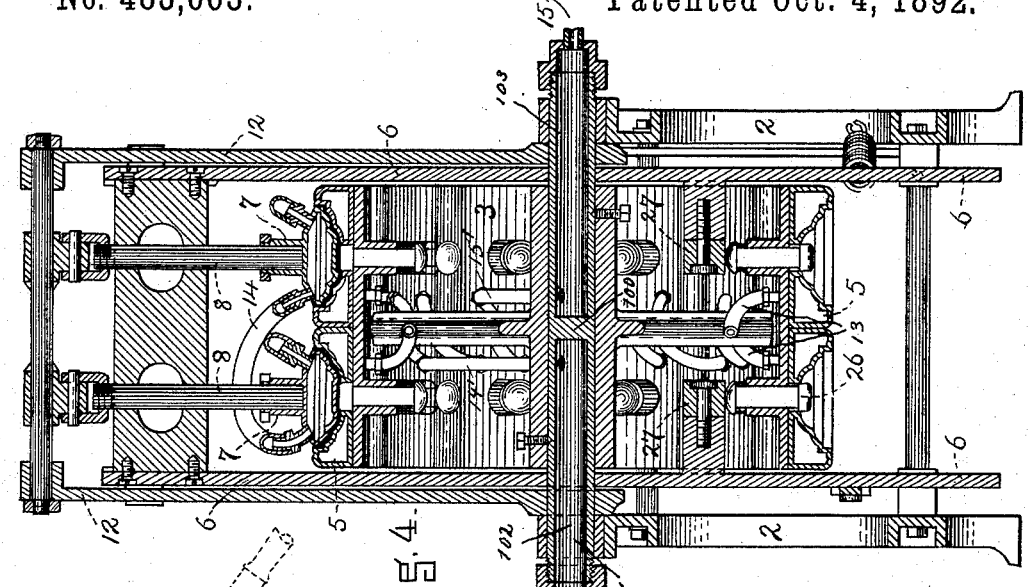
Figure 3:
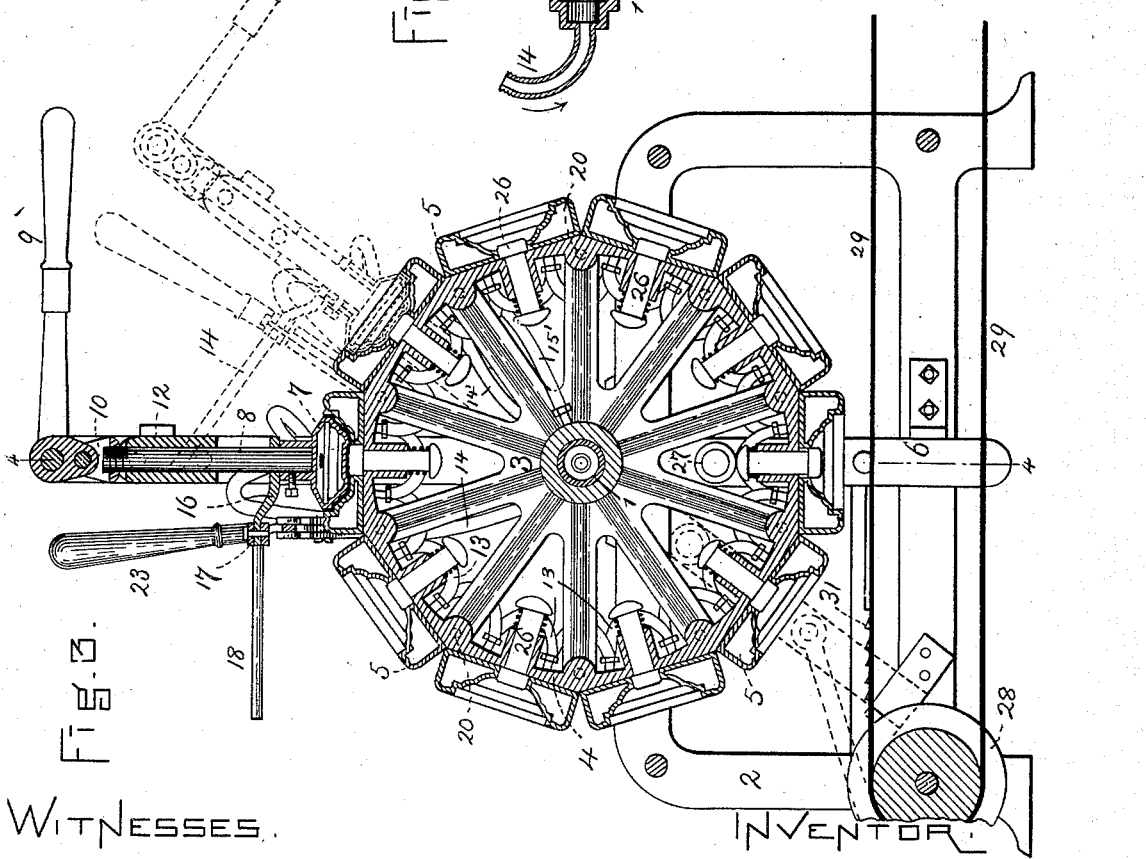

The drawings accompanying this specification represent, in Figure 1, an end elevation, and Fig. 2 a side elevation, of a molding-machine embodying my invention. Fig. 3 is a vertical sectional elevation transversely of the axis of the carrier. Fig. 4 is a similar view longitudinally of the axis. Fig. 5 is a diagrammatic view showing the manner in which the molds are connected. Fig. 6 is a detail view to show the spring-bolt which controls the carrier. Fig. 7 is a plan in part of the top of the machine, showing the several operating-levers at this point on a reduced scale.

In the accompanying drawings I have shown a fixed standard composed of twin upright housings 2 2, in which is mounted a rotary carrier or cylinder 3, furnished on its periphery 4 with a series of removable molds 5, adapted for liquid circulation, and in the present instance of a shape to produce inanimate pigeons or targets. Mounted upon the axis of the cylinder and free to swing thereupon rise vertical posts 6 6, which support two reciprocating plungers 7 7, with actuating-rods 8 8. These latter are given movement by a handle 9 and a compound lever 10, pivoted at the upper end of oscillating fulcrum-bars 12, which are likewise supported on the axis of the cylinder. The plunger-heads are hollow and adapted to receive liquid, being connected in series with the molds by flexible pipes or rubber tubing 14. The fluid enters by pipe 14, passes to the first plunger-head, then discharges into the second, when two are employed, and thence flows by means of pipe 14 (see Fig. 1) to the hollow shaft 1, on which the rotary carrier 3 is mounted, the said hollow shaft 1 having a central partition 100, which divides the same into two chambers 102 103. The chamber 102 in the hollow shaft 1 has connection with a mold 5 through the pipe 14', (see Figs. 3 and 4,) and the series of molds are connected by short pipes 13, the last mold of the series having a return-pipe 15', which empties into the chamber 103 in shaft 1, from whence the cooling liquid is drawn by the pipe 15. It will thus be seen that there is a continuous fluid-circuit through the plunger-head and molds.

In the present instance I have employed two plungers, and therefore provide two series of molds—one for each plunger—peripherally about the cylinder. In addition to the reciprocating movement imparted to the plungers by the compound lever 10 and lever-handle 9 axial movement or semi-rotation is given to the said plungers by means of two projecting arms 16, attached to the rods 8 8 and simultaneously moved by means of the rod 17 and the operating-lever 18. This axial movement of the plungers I consider an important feature, since I free them from the material and overcome the suction which ordinarily occurs in molding articles. In this way the plungers can be lifted without pulling out the article until the proper time comes for removing said articles from the molds.

In the operation of the plungers it becomes necessary to interlock the carrier and the plunger. This is effected by similar locking mechanism on each side, which consists of opposite pin 19, adapted to enter holes 20, said pins being normally forced inwardly by springs 40 in the periphery 4 of the carrier 3. Said pins are supported in brackets 21, attached to the posts 6, and are controlled by a lever-bar 23, said lever-bar being actuated by springs 40, acting on pins 19. Furthermore, in subsequent proceedings it becomes necessary to release the plunger-frame from the cylinder and permit oscillation or reverse swinging of the said frame. At this time the cylinder must be held stationary. To effect this, a spring-actuated bolt 24 (see Fig. 2) is secured to one of the housings 2 of the standard, and this is tripped at certain designated times, to be subsequently explained, by means of the lower end of one of the oscillating posts 6.

To discharge the molded article at the proper time, the bottom of each mold 5 is furnished with a spring-actuated push-pin 26, which is adapted to move up and eject the article contained within the mold at the time of the passage of said pin over a movable roller 27. This latter is mounted upon an arm inside of the housing. Transversely beneath the machine is placed a drum 28, suitably mounted and about which passes an endless band 29, adapted to receive the molded articles as they are displaced by the push-pins 26 when the latter engage the roller 27 or an equivalent. This drum has intermittent motion imparted to it (see Fig. 1) by a ratchet-wheel 30, fastened to the head of the drum 28, the said ratchet-wheel being actuated by a ratchet-bar 31, the toothed or free end of which rests upon the ratchet-wheel 30, said ratchet-bar 31 being carried by the lower end of one of the oscillating posts 6 and from which it receives an intermittent thrust and drag movement to rotate the ratchet-wheel 30 and drum 28, so that as the carrier or cylinder 3 is rotated and the posts 6 oscillate the belt 29, carried by the drum 28, is moved to carry the molded articles from beneath the carrier as they are delivered upon the belt.

The above-described instrumentalities cooperate as follows in the act of molding an article from some compound when in a plastic condition: It is assumed that the carrier and plunger-frame are interlocked by the pins 19, and, further, that the lever-handle 9 is in an upright position, with the plungers raised and the oscillating fulcrum-bar 12 inclined. The lower end of one of the posts 6 now bears against the rod 41, which rod actuates a bell-crank lever 42, (see Fig. 2,) which in turn imparts a vertical movement to the rod 43, and through the bell-crank lever 44 operates the spring-bolt 24 to retract the same and release the carrier 3, and, moreover, that heated material has been poured into and now fills the molds beneath the plungers. While the material is in this semi-viscous or plastic condition, the handle 9 is pulled down until it stands at right angles to the plunger-rods 8. At this time the maximum pressure is attained and the article is molded. This action of the handle has oscillated the fulcrum-bars 12, which now stand in a vertical position. The carrier is now in readiness to revolve, the bolt 24 being withdrawn, as stated. The next step is to partially reverse the handle 9 to relax somewhat the pressure which the plungers exert on the mold, after which the lever 18 is moved to and fro, thereby producing axial movement of the rods 8 8 and frees the article, overcoming the sucking action created by the act of molding. With the parts now remaining in the same position the cylinder and plungers interlocked are moved into the position shown in dotted lines in Fig. 3 or until a hole 20 in one side of the carrier registers with the locking-bolt 24 on the standard, when the latter enters it and the carrier is held removable. The plungers are not drawn back into their upraised position until the empty molds are filled with material, which can be readily poured in, since the plungers are at this time held to one side of said molds, and therefore do not interfere with the act of filling. After such act the handle 9 is reversed until it stands in a vertical position, which throws the plungers fully back. The spring lever-bar 23 is now grasped and moved until the spring-pressed locking-pins 19 are withdrawn from the carrier. The plungers and plunger-frame are then swung back. Such action results in not only returning the plungers to their first position, but places them above the molds just filled and which were advanced into position beneath the plungers, this advance being caused by the partial rotation of the cylinder. Furthermore, upon reversal of the plunger-frame with the handle 9 upright the lower end of one of the posts 6 has again met the rod 41, and, through the above-described connections with bolt 44, retracted the said bolt and released the carrier, while the spring-pins 19 have entered the holes 20 as soon as the hand-lever 23, spring-actuated, is released. The cylinder and the plungers are interlocked thereby, and the several elements are now in the respective positions first assumed and in readiness to mold the fresh material just delivered into the molds and repeat the previous movements before described.

What I claim is—

1. In apparatus for molding articles, a revoluble carrier mounted upon a horizontal shaft and furnished with hollow molds placed circumferentially thereon and adapted for internal fluid circulation, combined with co-operating plungers having hollow heads also adapted for fluid circulation, together with means for operating the plungers, and mechanism for ejecting the finished articles from the molds, substantially as described.

2. In apparatus for molding articles, a rotary carrier provided with hollow molds about its circumference, combined with a series of reciprocating plungers, likewise hollow, and a frame which supports said plungers and swings on the axis of the carrier, said mold-plates and plungers being adapted to permit of fluid circulation within them, substantially as explained.

3. In combination with a suitable standard, a revoluble mold-plate carrier and mechanism to lock the two together, one or more reciprocating plungers, a swinging frame adapted to support said plungers and pivotally mounted on the axis of the revoluble carrier, oscillating fulcrum-bars likewise pivoted on said axis, and a lever which actuates said plungers, substantially as described.

4. The combination, with a rotary carrier, the removable molds secured circumferentially thereabout and fitted for internal fluid circulation, of a swinging frame upon the carrier-axis, one or more reciprocating lever-actuated plungers mounted in said frame, and a lever to impart axial rotation to the plunger, substantially as specified.

5. In combination with a revoluble mold-plate carrier and a series of co-operating plungers, a series of removable hollow molds with inlet and outlet passages, and a movable push-pin in said plates, together with mechanism on the standard adapted to actuate said pins by the rotary movement of the carrier and so discharge the molded articles from the molds at predetermined intervals, substantially as described and stated.

6. In apparatus for molding articles, a revoluble mold-carrier, one or more co-operating plungers, a swinging frame which supports said plungers, and locking-pins 19, with the controlling-lever 23, adapted to release the plunger-frame when interlocked with the carrier, combined with the fulcrum-bars 12, pivoted upon the carrier-axis, a lever 10, uniting said plungers and bars, and lever-handle 9, all operating substantially as explained.

7. In apparatus for molding articles, a suitable standard, a rotary mold-plate carrier for liquid circulation, a plunger-frame and plungers likewise for internal fluid circulation, adapted to swing upon the carrier-axis, oscillating fulcrum-bars likewise upon said axis, mechanism operated by said plunger-frame to lock the standard with the carrier, mechanism for locking the plunger-frame with the carrier, a lever for operating the same, together with means for imparting axial rotary movement to the plungers, as likewise means for ejecting the molded articles from the carrier, substantially as herein set forth and specified.

8. In combination with a revoluble carrier, a series of mold-plates circumferentially thereon, inlet and outlet passages for fluid circulation in said plates, push-pins for ejecting articles from the molds, one or more plungers upon an oscillating frame, mechanism for reciprocating said plungers, mechanism, as described, for interlocking the plunger-frame and carrier, as likewise means for locking the carrier and standard together, and a drum with an endless band intermittently actuated to receive the molded articles, substantially as set forth.

In testimony whereof I affix my signature in presence of two witnesses.

HENRY C. WARREN.

Witnesses:
H. E. LODGE,
FRANCIS C. STANWOOD.